United States Patent Office 2,764,390
Patented Sept. 25, 1956

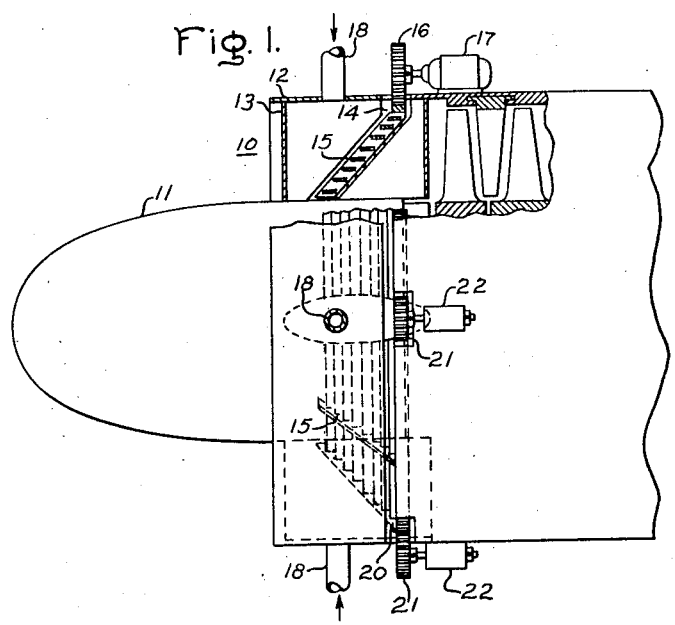
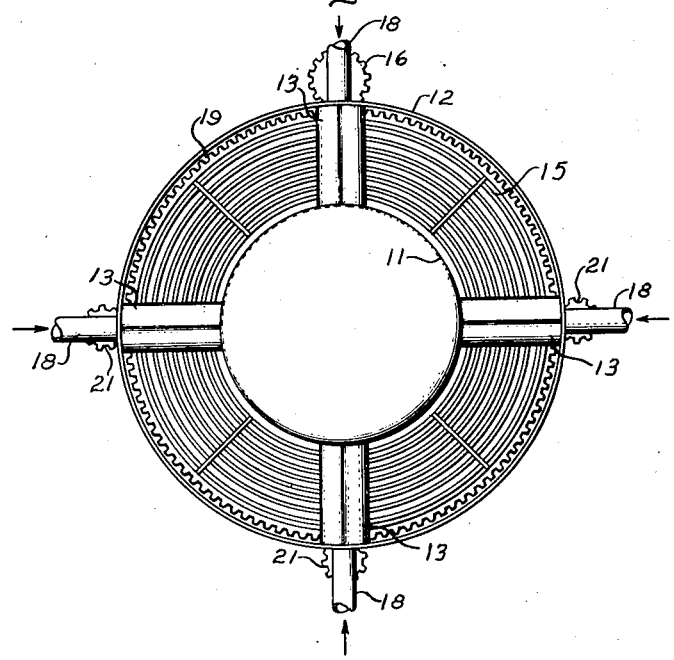

2,764,390
ANTI-ICING DEVICE

John C. Harris, Jr., Lynn, Mass., assignor to General Electric Company, a corporation of New York Application April 1, 1954, Serial No. 420,291
5 Claims. (Cl. 257—1)

The present invention relates generally to aircraft gas turbines and specifically to an air inlet filter screen for such turbines when used in aircraft installations, although its applicability is not limited thereto.

It is customary to provide an inlet filter screen for aircraft gas turbines in order to restrain loose objects such as ground or battle debris from passing through the power plant thus avoiding damage to the compressor blading. It is well known that the resistance of the filter to the flow of air through the inlet reduces engine performance, but nevertheless its use is required when objectionable subject matter is present in the atmosphere. A greater problem is the tendency of ice to form on the screen blocking the air inlet passage of the power plant, thereby choking the air flow with a resultant great increase in temperature level at which the turbine operates. In general, gas turbine power plant output increases with increasing temperature level, while the life of various critical structural elements decreases. It is, therefore, desirable to operate such power plants at the highest temperature level consistent with the desired life expectancy of the previously mentioned structural elements. Accordingly, it should be apparent that if an icing condition occurs which tends to increase the temperature level at which the turbine is operating, almost immediately the turbine will begin to operate at an unsafe temperature level and premature deterioration, if not failure, of parts will occur.

Therefore, it is an object of this invention to provide gas turbine power plants with protection against the entry of foreign material.

Another object of this invention is to provide an improved means for preventing excessive ice formation on inlet filter screens for aircraft gas turbines.

Still another object of this invention is to provide an improved means for de-icing the filter when used with aircraft gas turbines.

A further object of this invention is to provide an inlet filter screen which can be kept continually clear of foreign objects.

These and other objects and advantages of this invention will become more apparent from the following description taken in connection with the accompanying drawing in which:

Figure 1 is a cross sectional view of an air inlet passage for an aircraft gas turbine provided with a filter screen in accordance with the invention, and Figure 2 is a front view looking axially into the air inlet passage in the direction of flow.

The objects of my invention may be accomplished by periodically passing all parts of the filter screen through a heated area to prevent or remove any ice accretions thereon.

Referring to the drawing, the inlet end of an aircraft gas turbine power plant is disclosed at 10, comprising inner and outer duct walls 11 and 12 respectively, which define an annular air inlet passage. The inner duct wall 11 defines the inlet cone or "bullet nose" which encloses certain accessories and is supported in position by a number of hollow struts 13, of which four are shown. These struts 13 have an angular slot 14 cut through opposing walls and through which rotatable filter screen 15 passes, the screen being suitably supported by guide pinions 21 mounted on bearing supports 22 and driven through means such as gears 16, 19 and electric motor 17.

The hollow struts are heated by hot air introduced through inlets which are shown at 18, the air being bled off from an appropriate source in the power plant. An electric heating element (not shown) may be installed within the hollow strut 13 for additional heating when icing conditions are severe. An exterior slot 20 is for the disposal of foreign debris which has accumulated on the filter screen and which can be disposed of automatically as the rotating filter screen passes through the strut. The angular configuration of the screen will tend to entrap the collected material at its outer radius from which it can be collected readily.

Thus it will be seen that the invention provides power plant protection against damage by entry of foreign objects and minimizes the tendency of ice formation to the extent of affecting power plant performance.

While a particular embodiment of the invention has been illustrated and described it will be obvious to those familiar with the art that various changes and modifications may be made without departing from the invention, and it is intended to cover in the appended claims all such changes and modifications that come within the true spirit and scope of the invention.

What I claim as new and desire to secure by Letters Patent of the United States is:

1. In combination with an air inlet for a turbomachine outer and inner duct walls defining said inlet, said inner duct wall defining an inlet cone, a hollow strut for supporting the inlet cone, means for heating said strut, a slot cut through said strut, a screen adapted to revolve through said slot, and means for revolving said screen.

2. In combination with an annular air inlet for a gas turbine power plant, a rotatable filter screen, outer and inner duct walls defining said inlet, said inner duct wall defining an inlet cone, a hollow strut joining said outer and inner duct walls and having a slot through which said screen is adapted to pass, means for rotating said screen through said slot, and means for heating said strut whereby ice formation on said screen is alleviated.

3. In a combination as set forth in claim 2, said outer duct wall having an opening adjacent the downstream side of said hollow strut and adjacent the outer circumference of said screen.

4. In combination, inner and outer spaced walls defining an annular air inlet for a gas turbine power plant, a hollow strut for supporting said walls in spaced relationship and having a slot through opposite walls thereof, said slot angled inwardly and in a forward direction from said outer wall toward said inner wall of said annular air inlet, a rotatable filter screen in said air inlet, said screen passing through said slot, means for providing heat to said strut, and means for rotating said screen.

5. In an aircraft gas turbine, an annular air inlet therefor comprising spaced outer and inner duct walls, a plurality of hollow airfoil shaped struts interconnecting said walls for spacing thereof, an angular slot in opposed wall surfaces of said struts angled inwardly and in a forward direction from said outer duct wall toward said inner duct wall, a rotatable filter screen passing through said slots, means for rotating said screen, and means for heating said struts, and slots in the outer duct wall communicating with said struts whereby foreign matter held back by said screen may be discharged.

References Cited in the file of this patent

UNITED STATES PATENTS

| | | |
|---|---|---|
| 2,482,720 | Sammons | Sept. 20, 1949 |
| 2,601,907 | Burrows et al. | July 1, 1952 |
| 2,680,345 | Frost | June 8, 1954 |